(12) United States Patent
Schaefer et al.

(10) Patent No.: US 9,026,767 B2
(45) Date of Patent: *May 5, 2015

(54) ADAPTIVE ADDRESS MAPPING WITH DYNAMIC RUNTIME MEMORY MAPPING SELECTION

(75) Inventors: Andre Schaefer, Braunschweig (DE); Matthias Gries, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 13/419,172

(22) Filed: Mar. 13, 2012

(65) Prior Publication Data

US 2013/0246734 A1  Sep. 19, 2013

Related U.S. Application Data

(63) Continuation of application No. 12/646,248, filed on Dec. 23, 2009, now Pat. No. 8,135,936.

(51) Int. Cl.
*G06F 12/10* (2006.01)
*G06F 12/06* (2006.01)

(52) U.S. Cl.
CPC .......... *G06F 12/063* (2013.01); *G06F 12/0646* (2013.01); *G06F 12/10* (2013.01)

(58) Field of Classification Search
CPC ... G06F 12/063; G06F 12/0607; G06F 12/10; G06F 12/06; G06F 12/0646
USPC .................. 711/112, 170, 202, E12.082, 203
See application file for complete search history.

(56) References Cited

U.S. PATENT DOCUMENTS

| | | | |
|---|---|---|---|
| 5,701,438 A * | 12/1997 | Bains | 711/211 |
| 5,983,270 A | 11/1999 | Abraham et al. | |
| 6,026,475 A * | 2/2000 | Woodman | 711/202 |
| 7,539,782 B2 * | 5/2009 | Davis et al. | 710/3 |
| 7,620,772 B1 * | 11/2009 | Liikanen et al. | 711/112 |
| 7,870,363 B2 * | 1/2011 | Tang et al. | 711/203 |
| 8,621,181 B1 * | 12/2013 | Zhu et al. | 711/209 |

(Continued)

OTHER PUBLICATIONS

Office Action from Korean Patent Application 2010-0132795 mailed Nov. 30, 2011, 3 pages.

(Continued)

*Primary Examiner* — Pierre-Michel Bataille
(74) *Attorney, Agent, or Firm* — Blakely, Sokoloff, Taylor & Zafman LLP

(57) ABSTRACT

A system monitors and dynamically changes memory mapping in a runtime of a computing system. The computing system has various memory resources, and multiple possible mappings that indicate how data is to be stored in and subsequently accessed from the memory resources. The performance of each memory mapping may be different under different runtime or load conditions of the computing device. A memory controller can monitor runtime performance of the current memory mapping and dynamically change memory mappings at runtime based on monitored or observed performance of the memory mappings. The performance monitoring can be modified for any of a number of different granularities possible within the system, from the byte level to memory channel.

21 Claims, 4 Drawing Sheets

(56) References Cited

U.S. PATENT DOCUMENTS

| | | |
|---|---|---|
| 2003/0208505 A1* | 11/2003 | Mullins et al. ............... 707/102 |
| 2010/0049595 A1* | 2/2010 | Parry ............................ 705/11 |
| 2010/0287536 A1 | 11/2010 | Chung et al. |
| 2011/0099324 A1 | 4/2011 | Yeh |
| 2012/0124304 A1 | 5/2012 | Asnaashari et al. |

OTHER PUBLICATIONS

Notice of Allowance from U.S. Appl. No. 12/646,248 mailed Oct. 26, 2011, 9 pages.

Certificate of Patent in related Korean Application No. 2010-0132795, Registration Date, Aug. 14, 2012, 3 pages including English Translation of Certificate of Patent.

* cited by examiner

ADAPTIVE ADDRESS MAPPING WITH DYNAMIC RUNTIME MEMORY MAPPING SELECTION This application is a continuation of, and claims the benefit of priority of, application Ser. No. 12/646,248, filed Dec. 23, 2009 now U.S. Pat. No. 8,135,936.

FIELD

Embodiments of the invention are generally related to memory management, and more particularly to dynamic memory mapping.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2009, Intel Corporation, All Rights Reserved.

BACKGROUND

As computing systems have continued to develop, there has been a steady increase in the amount of memory resources available within a system for storing instructions and temporary or volatile data in the computing systems. All indications suggest that the trend will continue, and memory architectures will continue to expose more and more parallel resources to the memory controller. The parallel resources may include structures such as number of channels, bank groups, pages, and columns. The memory controller controls how access to the structures of the memory architecture is made.

Access to the structures of the memory architecture is controlled by memory mappings, which map physical memory addresses to the memory resources. Different memory mappings imply different latency, throughput, and power penalties. Current computing systems may have multiple possible mapping schemes, which function to control access to the memory resources in different ways. Current mapping schemes use static mapping tables that are selected at startup or reboot, and fixed for runtime of the computing system. The use of static mapping tables is inflexible and cannot take into account different load conditions that may only be apparent at runtime.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, a system allows adaptive memory mapping selection. By adapting the mapping of physical address space to memory resources, access penalties can be more flexibly controlled, improving performance such as latency, throughput, and/or energy efficiency. Design objectives and use of the computing system at a given time can vary greatly depending on the current workload as set by applications in use in the computing system. Based on the design objectives and use of the system, the address mapping is adapted during runtime for the current working conditions.

Thus, a memory controller of a computing system monitors and dynamically changes memory mapping during runtime. The controller may monitor system performance and select from among multiple possible mappings to match performance to a given policy. The performance monitoring can be modified for any of a number of different granularities possible within the system, from the byte level to memory channel.

Figure 1:
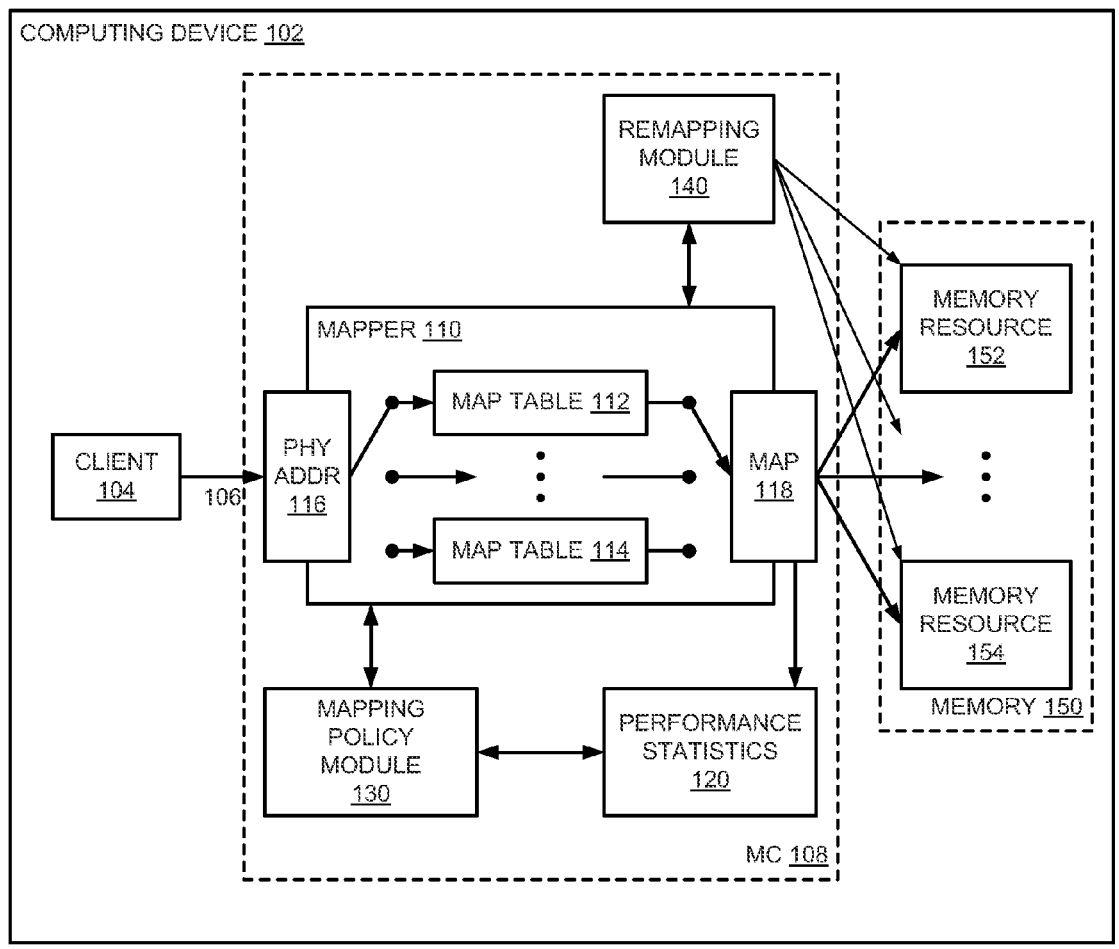
FIG. 1 is a block diagram of an embodiment of a system that dynamically selects at runtime from among different memory mappings.

FIG. 1 is a block diagram of an embodiment of a system that dynamically selects at runtime from among different memory mappings. Computing device 102 represents any type of computing system that includes operating memory to provide instructions and data for execution by a processor. Examples of a computing device may include desktop or laptop computers, netbooks, servers, handheld devices, or other devices that provide memory that can be randomly written and read.

Computing device 102 includes client 104, which represents any type of application, agent, or system software component that may perform a memory access. Client 104 may be, for example, end-user applications executing on a processor of computing device 102, any component of an operating system, drivers, or other software. Client 104 makes access request 106, which specifies an address of a memory item (e.g., variable, code) to access. It will be understood that the address of access request 106 may be a virtual address or a physical address. Virtual addresses are converted to physical addresses. Ultimately, the memory item that is the subject of access request 106 is associated with physical address 116.

Access request 106 is sent to memory controller (MC) 108. MC 108 includes hardware and firmware (code) to control memory access to memory 150 of computing device 102. In one embodiment, MC 108 includes mapper 110, which is an abstraction to represent the function of MC 108 to map physical address 116 to separate resources of memory 150. Map 118 represents the mapping of physical address 116 to memory resources 152-154 of memory 150. It will be understood that a mapping refers to a correspondence or a relation between a physical memory address and an actual location in the hardware of memory 150. The correspondence may be different depending on a currently selected mapping.

The mapping between physical address 116 and map 118, which represents the relation in memory 150, is determined by map tables 112-114. Map tables 112-114 represent any mechanism used to provide a memory mapping by which access request 106 can be serviced by access to memory 150. The map "tables"will be understood as possible examples of how addresses may be mapped. A table is generally used by reading an entry with a key that has at least one corresponding data element. In the case of map tables 112-114, the key is physical address 116, and the corresponding field or value or data element is map 118 (or a value to access a location in memory 150). Map 118 may include an actual physical address and an offset, for example.

Memory 150 stores operating data and instructions for computing device 102. The operating data and instructions include any code to execute (e.g., for the operating system (OS) and/or applications), data or elements of fixed value to be accessed or referenced for execution of the code, variables or elements of temporary value used in the execution of code, or any other item used in the runtime execution of computing device 102. As used herein, runtime execution of computing device 102, or simply "runtime,"refers to an instance or a session of execution on the computing device. The runtime refers to the environment of the operating system and the system state between boot up and reset, reboot, or shut down. Thus, runtime is an execution state or execution session that continues between boots of computing device 102.

Memory resources 152-154 may be any separation, physical and/or logical, of memory 150. It will be understood that the actual structure represented by each memory resource 152-154 is dependent upon implementation, In one embodiment, the structure may be dynamically changed with a change in memory access policy. Memory resources 152-154 may each be or include a memory channel, a memory bank, a memory bank groups, memory pages, memory columns, or logical sections of memory. All resources responsible for storing and accessing the data in memory are included.

A memory channel may refer to different physical memory devices, such as integrated circuits (ICs) or chips on a memory card, or separate memory cards. A memory bank refers to a grouping of memory locations, which may or may not be restricted to specific devices, A memory back groups refers to a group of memory banks, or a grouping of memory location groups. A memory page refers to a specified or defined amount of memory that may be accessed at a time, and may vary with each computing system implementation. Memory columns may refer to a vertical grouping of memory locations in a stacked memory configuration. While certain of the terms may be understood specifically with reference to a particular memory technology (e.g., DRAM (dynamic random access memory)), it will be understood that the principles described herein are generally applicable to any memory technology, Thus, different types of RAM (random access memory) or other memory that allows random read and write capability may be used.

MC 108 includes performance statistics 120. As used herein, "performance"refers to any measure of the operation of access to memory 150. Thus, performance may include speed as measured by latency and/or throughput, as well as usage of memory resources and power efficiency. Performance statistics 120 include any statistics or measured or monitored values that indicate an aspect of the operation of memory access. Memory access will be understood to include reading from and/or writing to the memory.

Performance statistics 120 are gathered during runtime of computing device 102, and provide data indicating how access to memory 150 functions. Performance statistics 120 may be gathered by a statistics module that can perform monitoring tasks of different complexity. In one embodiment, monitoring includes simply counting events, such as the number of accesses to a particular memory resource. In one embodiment, monitoring includes more complex statistics, such as the number of consecutive reads to a particular memory resource and/or address ranges used.

Mapping policy module 130 processes or evaluates performance statistics 120 to determine whether a currently selected map table (in FIG. 1, map table 112 is selected, while other map tables such as 114 are not selected) provides a performance desired by a selected policy. In one embodiment, policy module 130 compares the performance of the selected map table against a threshold of performance (e.g., compares a number of accesses to a particular memory resource against a threshold (either high or low) of access to the memory resource). Thus, policy module 130 monitors and evaluates the performance of the system with reference to memory access with respect to the selected policy in terms of speed, resource usage, and/or power efficiency.

As for an access policy, it will be understood that general access schemes may include localizing data to one or more memory resources. Localizing data can improve power conservation and also improve latency. Another general access scheme may include interleaving data among memory resources. Interleaving generally includes access to more memory resources than localizing. Known access techniques may also include a so-called "open page mode"that attempts to maximize access to recently accesses memory resources, and "closed page mode,"which assumes a low locality, Other techniques may also be employed. Different map tables 112-114 may implement different policies or access techniques. Thus, changing or switching among different map tables may include changing or switching between localizing data and interleaving data, which can be for any purpose related to improving access latency, improving throughput, improving power conservation, or any combination of these.

MC 108 include remapping module 140, which functions to remap data among the various memory resources of memory 150 when the map table of mapper 110 is changed. Specific physical addresses correspond not only to specific locations of memory 150, but to the data that is written or stored at the location as well. Thus, when a different data map is used, the data may not correspond to the physical address of request 106. Remapping module 140 moves data (e.g., reads and rewrites) to different locations and memory resources of memory 150 to correspond, to the memory access policy of the new memory map. In one embodiment, remapping module 140 works as a background process that executes during idle cycles or times when data access is not being performed in response to client requests. In one embodiment, remapping module 140 performs remapping on an as-needed basis, writing new data to the proper memory resource location (and moving data already stored there), and moving data that is requested for a read. The background process and as-needed data remapping may also be combined.

While certain details have been described with specific reference to FIG. 1, it will be understood that the details may provide non-limiting examples. In general, a system that enables dynamic selection of a memory mapping is provided through a memory controller that monitors memory access performance and selects a memory mapping based on or in response to determined performance.

Adaptive address mapping as described herein allows for optimization of performance of memory access sequences in accordance with an optimization function. It will be understood that optimization of performance refers to attempting to gain improved performance, and is relative to a previous performance. Optimization should not be understood as achieving an absolute optimum performance, or be considered limiting. Certain optimizations may provide improved performance at first, which may degrade over time as runtime conditions change.

In one embodiment, a memory controller with adaptive dynamic memory mapping as described herein includes multiple configurable map tables that each define a valid mapping of physical addresses to memory resources. In one embodiment, each map table is associated with a "hit"table that tracks performance statistics related to the use of memory resources based on the associated address mapping of the current map table. The memory controller can then monitor the hit tables on the fly during runtime and determine when and how the address mapping should be changed. The determination of when and how to change the address mapping can be based on a configurable determination function or algorithm. Thus, if a decision to change a memory mapping is based on a threshold performance, the threshold can be configurable in the system to provide flexibility in the configuration and behavior of the memory mapping.

As mentioned above, if the currently active address mapping changes, data should be moved from old positions to new positions in the memory (e.g., DRAM(s)) for the affected address ranges. It will be understood that a change to the memory mapping may affect only certain address ranges or physical addresses. The moving of data to new positions can be performed gradually, and is performed by a remapping client component or remapping agent component.

In contrast to current systems that use static mapping tables that can only be reconfigured during re-boot, the adaptive mapping described herein can account for effects that are only visible during system runtime. For example, interfering memory accesses from other applications and I/O (input/output) services may only be visible during runtime, but could have a significant impact on memory access performance. The mapping policy module monitors, analyzes, and learns favorable address mapping schemes during runtime based on performance statistics. The monitoring and analysis allows automatic adaptation to changes in application behavior, usage scenarios, and design objectives (e.g., performance, energy efficiency, and power management). The adaptation can be performed with minimum impact for the end-user of the computing system, because the system continues to work during a change of address mapping.

In one embodiment, the mapping policy module generates a log or a report of the performance statistics that can be reviewed by a human user to make configuration decisions. Thus, for example, alternative map tables may be generated to more particularly address an effect that presents itself during system runtime, which could be more effectively dealt with by a change to available map tables.

It will be understood that the operation of the adaptive memory mapping is distinct from current mapping configurations, which do not consider the memory access performance in making decisions. Additionally, the adaptive memory mapping is distinguishable from technologies such as workload balancing and wear-out leveling. Workload balancing seeks to equalize work to various computation resources. Workload balancing functions by monitoring backlog and assigning tasks to different resources based on the monitoring. As described herein, adaptive memory mapping uses knowledge about the memory architecture, as seen by the monitoring of memory access performance.

Wear-out leveling similarly seeks to equalize workload among resources, typically storage. Wear-out level is common in SSD (solid-state disk) or flash disk usage, and explicitly moves data within the disk to balance the use of disk regions. Wear-out leveling is optimized only for the typical lifetime of a SSD disk, whereas adaptive memory mapping reacts on fine-grained monitoring events, and changes in its optimization goals during each individual run (e.g., each runtime session) of the system. Additionally, the concurrent use of resources is benefited by adaptive memory mapping (e.g., concurrent use of channels and bank groups), in contrast to wear-out leveling which can stretch and serialize activity on the disk.

Figure 2:
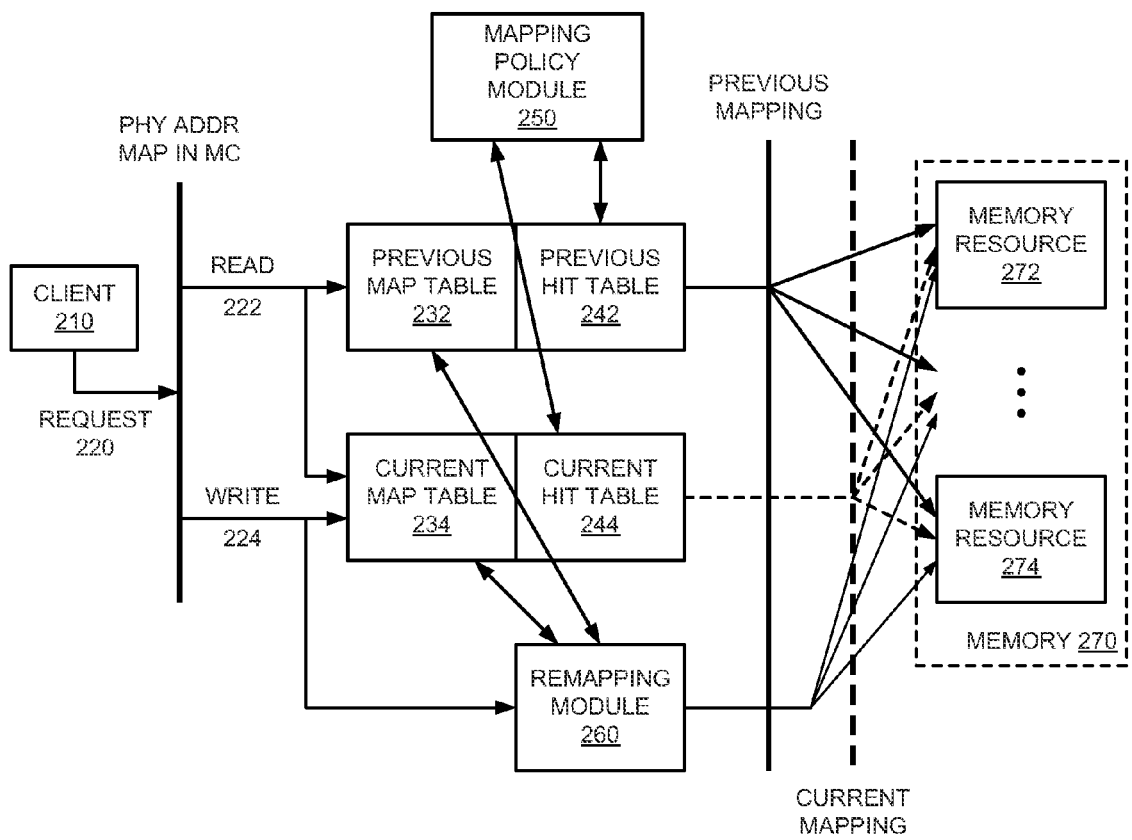
FIG. 2 is a block diagram of an embodiment of a system illustrating transition from one mapping to another when a different memory mapping is dynamically selected in runtime.

FIG. 2 is a block diagram of an embodiment of a system illustrating transition from one mapping to another when a different memory mapping is dynamically selected in runtime. System 200 is a computing system that employs adaptive memory mapping. System 200 includes client 210, which is an application or other software client that generates requests to access memory 270. The requests are represented by request 220, which is to be understood as a request channel over which multiple requests or a sequence of requests are made. Each request 220 has a physical address map in the memory controller. Each request could be a read request 222 or a write request 224.

System 200 is one example of a perspective of computing device 102 of FIG. 1, but illustrating different functional aspects. Additionally, the perspective of system 200 is snapshot of the system in operation, from a functional perspective. More particularly, system 200 illustrates the perspective of a transition from one mapping (designated as a "previous"mapping) to another (designated as a "current"mapping).

System 200 includes previous map table 232 and current map table 234. Previous map table 232 and current map table 234 may be the only map tables available in system 200, or they may be two of a set of map tables available in system 200. In system 200, it will be understood that previous map table 232 was being used to map physical addresses to memory 270. Mapping policy module 250 determined that a change should be made, and activated current map table 234 as the active map table in system. Mapping policy module 250 determines when to change map tables based on a performance of the memory access under the current map table. In one embodiment, mapping policy module 250 includes one or more performance thresholds (e.g., a maximum average latency, a minimum sustained throughput, or some other performance metric). When performance falls outside the performance thresholds, mapping policy module 250 may cause system 200 to switch map tables. In one embodiment, the system is configured to wait a period of time between map tables switches. The period of wait time could be a threshold that must be reached to cause a switch of map tables. As will be understood by those skilled in the art, switching too frequently would cause a negative impact on performance. The frequency of switching is implementation specific, but in general should be spaced far enough apart to achieve performance gain from the current mapping table.

Previous hit table 242 and current hit table 244 represent performance statistics mechanisms in system 200. The hit tables may be part of a statistics module, and are shown next to the map tables to indicate the association of a hit table with a map table. Generally, a performance monitoring mechanism is associated with a map table. Mapping policy module 250 monitors the hit tables to determine when to switch map tables. In one embodiment, hit tables 242 and 244 monitor the use of memory resources by their associated map tables, and enable mapping policy module 250 to make a determination whether to switch memory mappings (e.g., map tables) based on the configuration of its determination function or algorithm. Hit tables 242 and 244 indicate a runtime performance of the memory access, which may be referred to as access patterns of the system. The access patterns are the patterns of memory access that develop when accessing the memory in accordance with a particular policy or mapping.

As will be understood from the drawing, read requests 222 that occur after the switch from previous map table 232 to current map table 234 may still be serviced with previous map table 232. Although previous map table 232 would no longer be the currently active map table after current map table 234 was selected, reads on data stored in memory 270 under previous map table 232 may still need to be read under the previous mapping. For reads on physical addresses within an address space not affected by the change to current map table 234, or within an address space that has already been remapped, read request 222 is serviced by reference to current map table 234.

Write request 234 is serviced with reference to current map table 234 for data not already stored in memory 270, as well as for data that has already been remapped. For data that is being overwritten, and which has not been remapped, write request 224 is directed to remapping module 260 for writing to memory 270. Remapping module 260 remaps the data stored in memory resources 272-274 in response to the change from previous map table 232 to current map table 234. In one embodiment, remapping module 260 autonomously moves data within the memory 270 similar to a dedicated DMA (direct memory access) engine.

Remapping module 260 should be coupled with previous map table 232 to properly access data in accordance with the previous mapping. Remapping module 260 should also be coupled to current map table 234 to properly access data in accordance with the current mapping. The vertical lines in system 200 illustrate the separation of the memory access. Previous map table 232 accesses memory resources 272-274 in accordance with the previous mapping. Current map table 234 accesses memory resources 272-274 in accordance with the current mapping. Remapping module 260 may access memory resources 272-274 in accordance with both mappings until all data is mapped to the current mapping.

Figure 3:
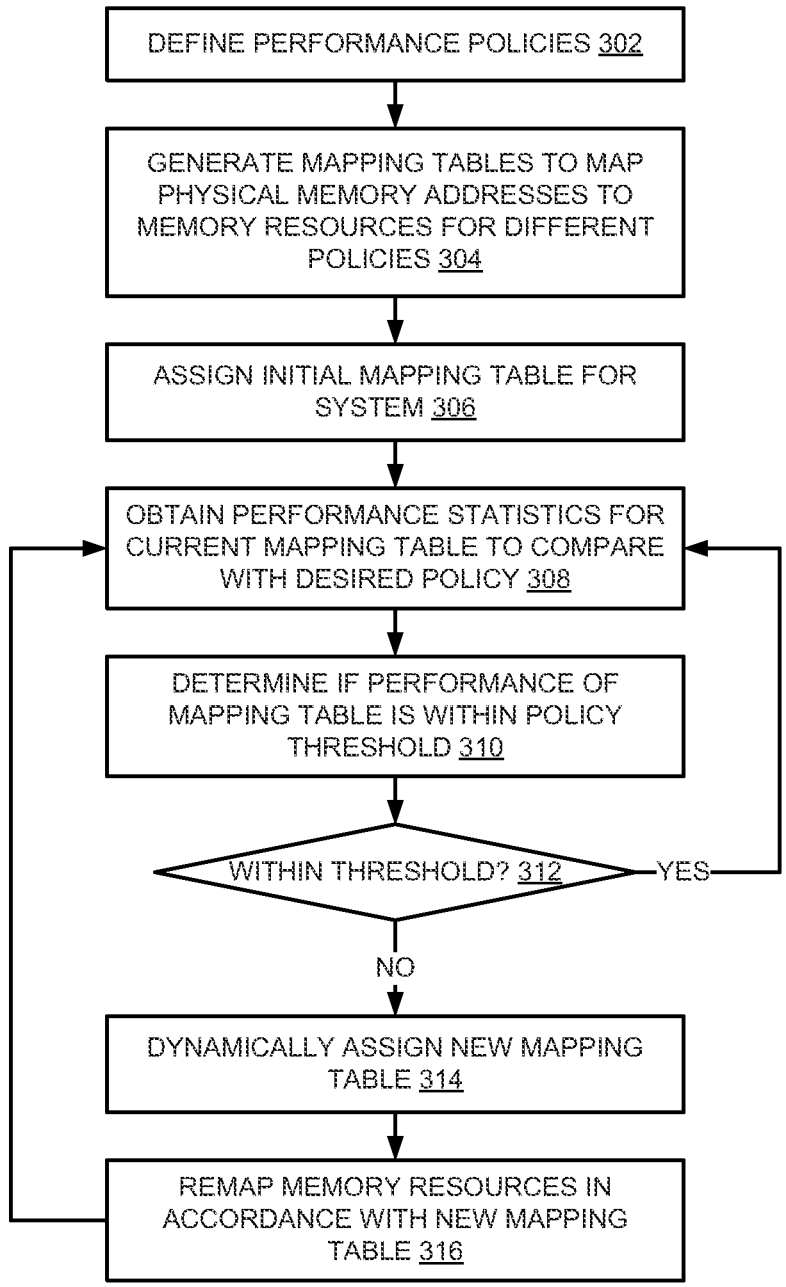
FIG. 3 is a flow diagram of an embodiment of dynamically changing a memory mapping in a runtime of a system.

FIG. 3 is a flow diagram of an embodiment of dynamically changing a memory mapping in a runtime of a system. Flow diagrams as illustrated herein provide examples of sequences of various process actions, which may be performed by processing logic that may include hardware, software, or a combination. Although shown in a particular sequence or order, unless otherwise specified, the order of the actions can be modified. Thus, the illustrated implementations should be understood only as an example, and the process can be performed in a different order, and some actions may be performed in parallel. Additionally, one or more operations can be omitted in various embodiments of the invention; thus, not all actions are required in every implementation. Other process flows are possible.

As part of system configuration, an administrator defines performance policies, 302. The performance policies may include parameters or metrics related to latency, throughput, power usage, memory usage, or other performance indicator.

In one embodiment, defining the performance policies includes defining thresholds or other mechanisms for transition from one memory mapping to another. The configuration of the system may also include generating mapping tables to map physical memory address of access requests to memory resources for the different policies, 304. Thus, there may be multiple mapping tables within the system, and each is related to a performance policy or performance goal.

The system or an administrator assigns an initial mapping table for the initial runtime of the computing system, 306. In one embodiment, the initial mapping table is specified within the system. The initial mapping table may be a table that is started by default. A memory controller within the system obtains or monitors performance statistics for the current mapping table to compare with a desired policy or an expected performance, 308. The memory controller, for example through a statistics module, determines if the performance of the mapping table is within a policy threshold, 310. The determination is made based on access patterns within the computing system, the threshold(s), and the monitored performance.

If the performance is within the threshold, 312, then no change to the mapping table is made, and the system continues to monitor performance of the access patterns under the current mapping table, 308. If the performance is outside the threshold, 312, the memory controller dynamically assigns a new mapping table during runtime of the system, 314. A remap module of the memory controller remaps the memory resources in accordance with the new mapping table, 316. The system then monitors performance of the new mapping table to determine when or if a new mapping table should be selected. If there are more than two mapping tables in the system, the system may select the mapping table that most closely matches a performance policy in place, or that is determined to make the memory access most closely match the desired policy.

Figure 4:
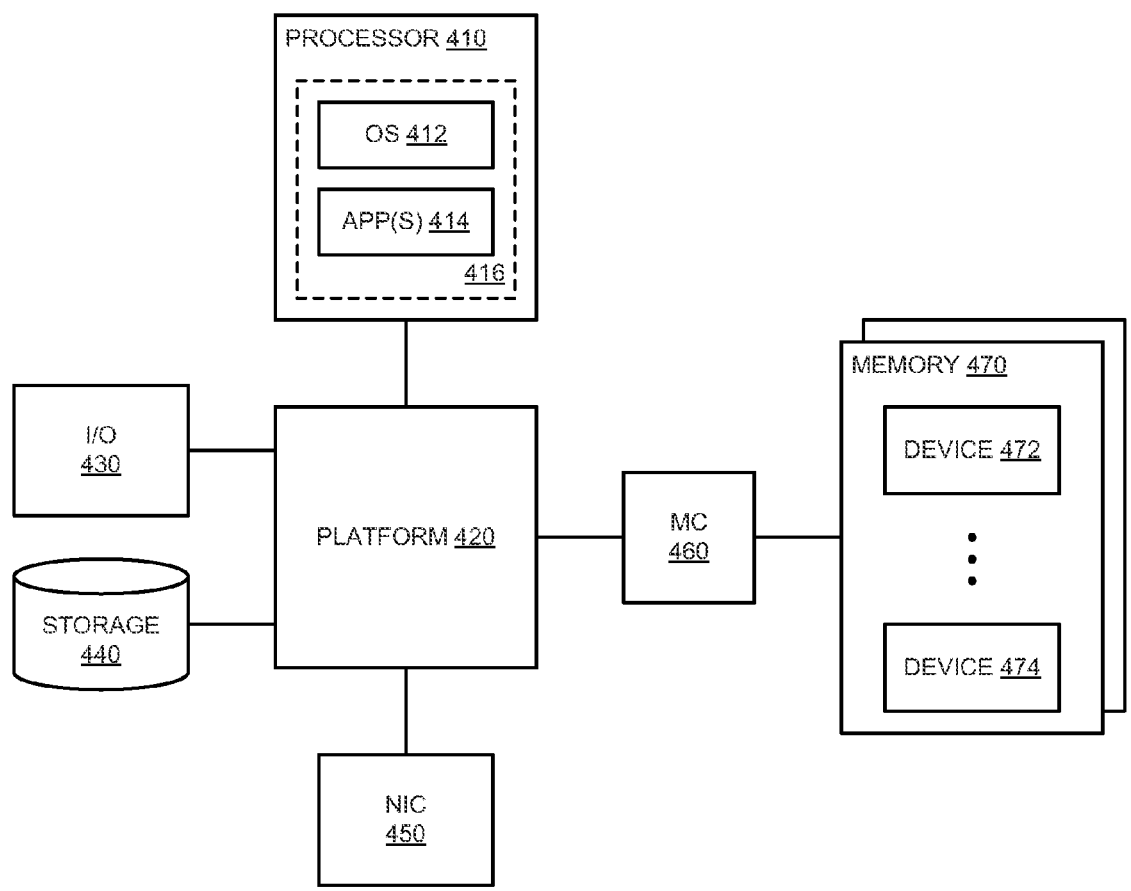
FIG. 4 is a block diagram of an embodiment of a hardware platform with a memory controller that dynamically selects at runtime from among different memory mappings.

FIG. 4 is a block diagram of an embodiment of a hardware platform with a memory controller that dynamically selects at runtime from among different memory mappings. System 400 is a computing system according to any embodiment herein that performs adaptive memory mapping. System 400 includes processor 410, which executes operating system (OS) 412 and one or more applications 414. The execution environment of OS 412 and applications 414 constitutes runtime session 416. Thus, a runtime is a "session"created by loading the OS and its associated applications. Each time the system is reset or rebooted, a new session is created. Significantly, adaptive memory mapping does not require changing a runtime session to change what memory mapping is applicable within the system to access (read and/or write) to memory 470.

System 400 includes platform 420, which provides the hardware platform through which peripheral devices connect to processor 410. Peripheral devices are any devices that connect with processor 410 over a bus or bus system (e.g., PCI (peripheral component interconnect), USB (universal serial bus), or others). Memory 470 stores operational code and/or data for execution by processor 410. Operational instructions and data refer to data that is loaded with runtime variables and configuration, and can be directly executed by processor 410, as opposed to a stored copy that must be modified with runtime configuration prior to execution. Typically memory 470 is volatile, which means that the values stored within memory 470 lose validity in the event power is interrupted to the hardware of system 400. In one embodiment, memory 470 is nonvolatile, such as a flash memory or phase change memory that stores operational instructions and data for execution.

Memory 470 includes memory resources 472-474, which are the internal architecture of structure of memory 470.

Memory resources 472-474 may be parallel resources or resources of the same type. It will be understood that memory 470 may include any of a number of structures (banks, channels, groups of banks, or other structures), each of which may be considered a different level of the architecture. Management of the resources occurs on a particular level, so that management occurs on parallel resources. Resources still exist from an architectural standpoint on other levels, but management occurs on parallel resources. In one embodiment, an access policy can apply to multiple types of memory resources, For example, a memory map can distribute access among memory channels, such as interleaving channel accesses, while also localizing accesses to particular devices within a channel.

I/O 430 provides interfaces by which other systems may interact with system 400, and interfaces through which human users interact with system 400. Storage 440 provides nonvolatile storage for system 400, the contents of which do not lose their validity even when power is interrupted. Items from storage 440 are not generally executed directly by processor 410, but are loaded into memory 470 for execution. NIC 450 represents a network interface circuit or network interface card through which system 400 interfaces with computing devices over a network.

MC 460 is a memory controller, which controls and monitors the memory access of memory 470. MC 460 may include one or more components as described above to enable dynamic memory mapping selection. In one embodiment, some or all components of MC 460 are located on platform 420. In one embodiment, some or all components of MC 460 are located on the same silicon or on the same circuitry that makes up memory 470.

To the extent various operations or functions are described herein, they may be described or defined as software code, instructions, configuration, and/or data. The content may be directly executable ("object"or "executable"form), source code, or difference code ("delta"or "patch"code). The software content of the embodiments described herein may be provided via an article of manufacture with the content stored thereon, or via a method of operating a communication interface to send data via the communication interface. A machine readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
monitoring a runtime performance of a memory mapping, wherein data is stored in physical memory resources in accordance with the memory mapping, the memory mapping to map physical memory addresses to the physical memory resources;
determining whether the monitored runtime performance is within a threshold; and dynamically changing the memory mapping in the runtime session in response to determining that the runtime performance is not within the threshold.

2. The method of claim 1, wherein monitoring the runtime performance of the memory mapping comprises: monitoring the runtime performance of a selected one or multiple map tables, where each map table defines a different mapping of physical memory to the physical memory resources.

3. The method of claim 1, wherein the physical memory resources comprise one or more of memory channels, memory banks, memory bank groups, memory pages, memory columns, or logical sections of physical memory.

4. The method of claim 1, wherein changing the memory mapping comprises: changing policy between interleaving and localizing data among the physical memory resources to improve latency, throughput, power conservation, or a combination of these.

5. The method of claim 1, wherein changing the memory mapping further comprises: remapping the data stored in the physical memory resources in accordance with the changed memory mapping.

6. The method of claim 5, wherein remapping the data comprises:
remapping the data as a background process that executes during cycles of inactivity in the physical memory resources.

7. The method of claim 5, wherein remapping the data comprises: remapping the data in response to an access request for data to a remapped address.

8. An apparatus, comprising:
a memory controller to manage access to data stored on physical memory resources, the memory controller having circuitry to:
monitor a runtime performance of a memory mapping that maps physical memory addresses to the physical memory resources, wherein data is stored in the physical memory resources in accordance with the memory mapping, determine whether the monitored runtime performance is within a threshold, and
dynamically change the memory mapping in the runtime session in response to determining that the runtime performance is not within the threshold.

9. The apparatus of claim 8, wherein the memory controller circuitry to monitor the runtime performance of the memory mapping comprises circuitry to: monitor the runtime performance of a selected one or multiple map tables, where each map table defines a different mapping of physical memory to the physical memory resources.

10. The apparatus of claim 8, wherein the physical memory resources comprise one of memory channels, memory banks, memory bank groups, memory pages, memory columns, or logical sections of memory.

11. The apparatus of claim 8, wherein the memory controller circuitry to change the memory mapping comprises circuitry to:
change policy between interleaving and localizing data among the memory resources to improve latency, throughput, power conservation, or a combination of these.

12. The apparatus of claim 8, wherein the memory controller circuitry to change the memory mapping further comprises circuitry to: remap the data stored in the memory resources in accordance with the changed memory mapping.

13. The apparatus of claim 12, wherein the memory controller circuitry to remap the data comprises circuitry to: remap the data as a background process that executes during cycles of inactivity in the memory resources.

14. The computing device of claim 12, wherein the memory controller circuitry to remap the data comprises: circuitry to remap the data in response to an access request for data to a remapped address.

15. A computing device, comprising:
a physcial memory having multiple physical memory resources; and,
a memory controller to manage access to data stored on the physical memory resources, the memory controller to monitor a runtime performance of a memory mapping that maps physical memory addresses to the physical memory resources, wherein data is stored in the physical memory resources in accordance with the memory mapping, determine whether the monitored runtime performance is within a threshold, and dynamically change the memory mapping in the runtime session in response to determining that the runtime performance is not within the threshold.

16. An apparatus, comprising:
a memory controller to manage access to data stored on physical memory resources, the memory controller to monitor a runtime performance of a memory mapping that maps physical memory addresses to the physical memory resources, wherein data is stored in the physical memory resources in accordance with the memory mapping, and wherein the runtime performance indicates performance of the memory mapping with respect to an access pattern of a runtime session of the computing device, determine whether the monitored runtime performance is within a threshold, and dynamically change the memory mapping in the runtime session in response to determining that the runtime performance is not within the threshold.

17. An article of manufacture comprising a machine readable storage medium having content stored thereon, which when accessed, provides instructions to cause a machine to perform operations including:
monitoring a runtime performance of a memory mapping, wherein data is stored in physical memory resources in accordance with the memory mapping, the memory mapping to map physical memory addresses to the physical memory resources;
determining whether the monitored runtime performance is within a threshold; and
dynamically changing the memory mapping in the runtime session in response to determining that the runtime performance is not within the threshold.

18. The article of manufacture of claim 17, wherein the content to provide instructions for monitoring the runtime performance of the memory mapping comprises content to provide instructions for monitoring the runtime performance of a selected one or multiple map tables, where each map table defines a different mapping of physical memory to the memory resources.

19. The article of manufacture of claim 17, wherein the physical memory resources comprise one of memory channels, memory banks, memory bank groups, memory pages, memory columns, or logical sections of memory.

20. The article of manufacture of claim 17, wherein the content to provide instructions for changing the memory mapping comprises content to provide instructions for changing policy between interleaving and localizing data among the physical memory resources to improve latency, throughput, power conservation, or a combination of these.

21. The article of manufacture of claim 17, wherein the content to provide instructions for changing the memory mapping further comprises content to provide instructions for remapping the data stored in the physical memory resources in accordance with the changed memory mapping.

* * * * *